United States Patent [19]

Hessert et al.

[11] 4,276,935
[45] Jul. 7, 1981

[54] TREATMENT OF SUBSURFACE GAS-BEARING FORMATIONS TO REDUCE WATER PRODUCTION THEREFROM

[75] Inventors: James E. Hessert; Chester C. Johnston, Jr., both of Bartlesville, Okla.

[73] Assignee: Phillips Petroleum Company, Bartlesville, Okla.

[21] Appl. No.: 89,421

[22] Filed: Oct. 30, 1979

[51] Int. Cl.³ .................... E21B 33/138; E21B 43/00
[52] U.S. Cl. .................................... 166/295; 166/294
[58] Field of Search ................. 166/294, 295, 305 R, 166/263

[56] References Cited

U.S. PATENT DOCUMENTS

| | | | |
|---|---|---|---|
| 3,087,543 | 4/1963 | Arendt | 166/295 |
| 3,097,692 | 7/1963 | Holland et al. | 166/295 |
| 3,284,393 | 11/1966 | Vanderhoff et al. | 260/29.6 |
| 3,308,885 | 3/1967 | Sandiford | 166/295 |
| 3,343,599 | 9/1967 | Eddins, Jr. et al. | 166/294 |
| 3,624,019 | 11/1971 | Anderson | 260/29.6 H |
| 3,721,295 | 3/1973 | Bott | 166/294 X |
| 3,724,547 | 4/1973 | Bott | 166/274 |
| 3,734,873 | 5/1973 | Anderson et al. | 260/29.6 H |
| 3,780,806 | 12/1973 | Bott | 166/275 |
| 3,893,510 | 7/1975 | Elphingstone et al. | 166/295 |
| 4,034,809 | 7/1977 | Phillips et al. | 166/270 |
| 4,130,165 | 12/1978 | Fast et al. | 166/294 |

Primary Examiner—Stephen J. Novosad

[57] ABSTRACT

Excessive water production from a producing gas well is substantially reduced by the injection of a hydrocarbon-diluted water-in-oil emulsion comprising a viscosifying polymer such as polyacrylamide, the injected emulsified polymer swelling on contact with connate water in the subsurface gas producing formation to restrict transfer of water therethrough toward the producing gas well.

16 Claims, No Drawings

TREATMENT OF SUBSURFACE GAS-BEARING FORMATIONS TO REDUCE WATER PRODUCTION THEREFROM

This invention relates generally to improvements in the production of gas from subsurface gas-bearing formations. In one aspect the invention relates to methods of increasing the gas-to-water ratio of fluids produced from a gas well penetrating a gas-bearing formation.

As is well known by those skilled in the art, the production of large amounts of water from oil wells and gas wells constitutes a major item of expense in the recovery of hydrocarbons therefrom. This problem is of particular significance in the production of gas from gas wells where water can load the production tubing to the extent that the gas well dies and no longer produces gas. Under such conditions it is often necessary to periodically pump the water out of the production tubing in order to place the well back in condition to flow gas.

It would, therefore, be advantageous to treat the subsurface formations penetrated by the well bore of a gas well and forming the subsurface gas-producing interval so as to prevent or substantially reduce or restrict the flow of water from the formation into the well bore while maintaining substantially unrestricted gas flow into the well bore.

In accordance with the present invention, we have discovered that water production in producing gas wells can be significantly reduced or restricted without significant adverse effect on gas production by injecting a hydrocarbon-diluted polymeric concentrate containing a viscosifying polymer down the well bore of a producing gas well and into the gas-producing formation penetrated by the well bore, and allowing the viscosifying polymer to contact connate water in the formation so as to swell the polymer in the formation and thereby restrict the flow of water through the formation toward the producing gas well.

It is, therefore, an object of the invention to provide a method of enhancing the production of gas from gas production wells.

Another object of the invention is to provide a method of reducing the cost of producing gas from producing gas wells.

Yet another object of the invention is to provide a method of treating previously shut-in gas wells to place them back into economical gas production.

Other objects, aspects and advantages of the present invention will become readily apparent to those skilled in the art from a reading of the following detailed description and claims.

In accordance with the present invention, a suitable water-in-oil emulsion comprising a suitable viscosifying polymer, such as for example polyacrylamide, and diluted with a suitable hydrocarbon, such as for example diesel oil, is injected into a gas producing well to diminish water production and thereby greatly increase the effluent gas-to-water ratio. The treatment method of the present invention decreases water permeability in the formation penetrated by the gas producing well significantly whereas the gas permeability of the formation remains essentially unchanged. It is presumed that the treating agent in the form of a suitable water-in-oil emulsion tends to remain in the formation subsequent to polymer hydration upon contact with connate water in the formation, with the viscosifying polymer behaving as a selective plugging agent to restrict the flow of water in the formation without significantly restricting the flow of gas through the formation.

The novel process of the present invention is characterized by optionally injecting a preflush of alcohol, an inert gas or a suitable hydrocarbon into a gas producing well to remove water from the well bore area. A suitable water-in-oil emulsion, such as for example a polymeric latex concentrate, is diluted with a suitable hydrocarbon such as diesel oil. This hydrocarbon-diluted polymeric concentrate, optionally containing a suitable emulsion breaker, is then introduced into the gas producing well. This essentially water-free slug or charge of hydrocarbon-diluted polymeric concentrate is then flushed into the gas producing formation with a suitable drive fluid such as nitrogen or other suitable drive gas or diesel oil or other suitable liquid hydrocarbon drive fluid. The gas producing well is then allowed to produce back, giving a portion of the previously injected material from the gas producing zone together with minor amounts of water and larger quantities of gas resulting in a greatly increased gas-to-water ratio of the produced effluent.

Hydrocarbon-diluted water-in-oil emulsions suitable for injection into gas producing wells in the performance of the method of the present invention comprise suitable amounts of water, a suitable viscosifying polymer, a suitable hydrocarbon diluent, and, optionally, a suitable water-in-oil emulsifying agent. While any suitable amount of water can be present in the hydrocarbon-diluted water-in-oil emulsion which will maintain the stability of the emulsion during injection, water is generally present in the range from about 0.01 to about 5.0 weight percent and preferably from about 0.01 to about 3.0 weight percent based on the weight of the hydrocarbon-diluted water-in-oil emulsion.

The hydrocarbon-diluted water-in-oil emulsion further comprises a quantity of a suitable viscosifying polymer of any suitable amount, however the amount of viscosifying polymer generally ranges from about 1.0 to about 20 weight percent and preferably from about 5 to about 15 weight percent based on the weight of the hydrocarbon-diluted water-in-oil emulsion.

The hydrocarbon-diluted water-in-oil emulsions suitable for use in the present invention further comprise a suitable hydrocarbon diluent in a suitable amount. While any amount of suitable hydrocarbon diluent can be employed which will maintain the viscosifying polymer in a water-in-oil emulsion prior to contact with connate water in the gas producing formation, the hydrocarbon diluent is generally present in an amount in the range from about 75 to about 99 weight percent and preferably in the range from about 85 to about 95 weight percent based on the weight of the hydrocarbon-diluted water-in-oil emulsion.

A suitable hydrocarbon-diluted water-in-oil emulsion further comprises, on an optional basis, a suitable water-in-oil emulsifying agent in a quantity sufficient to facilitate the formation of the water-in-oil emulsion. While any suitable quantity of water-in-oil emulsifying agent can be employed, a quantity in the range from about 0.001 to about 30 weight percent and preferably in the range from about 0.1 to about 10 weight percent based on the weight of the hydrocarbon-diluted water-in-oil emulsion is deemed suitable.

Suitable water-in-oil emulsions comprising polymeric viscosifiers, which emulsions are sometimes referred to as polymeric latex concentrates, can be prepared by a number of methods well known in the art. For example, such emulsions can be prepared by using high speed agitation or ultrasonic techniques. In most instances, however, it is desirable that the emulsion be a stable emulsion and to achieve this end it is often necessary to employ an oil-soluble emulsifying agent. The amount of emulsifying agent necessary to provide an emulsion will have to be determined by routine experimentation. As a general rule it can be said that the amount of oil-soluble emulsifier can range from about 0.1 to about 30 percent by weight based on the weight of the oil. To produce stable emulsions, the amount of emulsifier will normally be within the range from about 12 to about 20 percent by weight of the oil.

Several polymeric latex concentrates suitable for use in the process of the present invention can be purchased as items of commerce and diluted with a suitable hydrocarbon solvent prior to use. One such suitable polymeric latex concentrate for use in the process of the present invention is designated as ALCOFLOOD ® 1100L, available from Allied Colloid Limited, which polymeric latex concentrate comprises 50 weight percent polyacrylamide in a water-in-oil emulsion.

Water-in-oil emulsions, or polymeric latex concentrates, suitable for dilution with a suitable hydrocarbon diluent for use in the process of the present invention generally comprise water, viscosifying polymer, hydrocarbon diluent and an optional water-in-oil emulsifying agent. While any suitable quantity of water can be employed which will maintain a stable water-in-oil emulsion, water is generally present in the range from about 1 to about 25 weight percent and preferably in the range from about 1 to about 15 weight percent based on the weight of the water-in-oil emulsion. Viscosifying polymer can also be employed in any suitable quantity which will provide a stable water-in-oil emulsion, but generally viscosifying polymer is provided in an amount in the range from about 20 weight percent to about 50 weight percent and preferably in the range from about 25 weight percent to about 35 weight percent based on the weight of the water-in-oil emulsion. Any suitable amount of hydrocarbon can be employed in the water-in-oil emulsion which will provide the desired stable emulsion, but generally hydrocarbon is provided in the range from about 5 weight percent to about 35 weight percent and preferably in the range from about 15 weight percent to about 25 weight percent based on the weight of the water-in-oil emulsion. The optional water-in-oil emulsifying agent is provided in a quantity which will provide a stable water-in-oil emulsion, but generally such emulsifying agent is provided in an amount in the range from about 0.1 to about 30 weight percent and preferably in the range from about 0.5 to about 5 weight percent based on the weight of the water-in-oil emulsion.

Viscosifying polymers suitable for use in the polymeric latex concentrates employed in the process of the present invention are well known in the art and have been previously described in numerous publications and patents. The polymers most commonly employed in many industrial applications are acrylamide polymers which include polyacrylamide and its water-soluble copolymeric derivatives such as, for instance, acrylamide-acrylic acid, and acrylamide-acrylic acid salt copolymers which contain from about 95 to about 5 percent by weight of acrylamide. Also useful are copolymers of acrylamide with other vinyl monomers such as maleic anhydride, acrylonitrile, styrene and the like. Polymers and copolymers derived from acrylamide are preferred for employment in the process of the present invention.

Hydrocarbon liquids suitable for dilution of the water-in-oil emulsions or polymeric latex concentrates include aliphatic and aromatic compounds such as toluene, xylene, benzene, crude oil, diesel fuel, kerosene, naphthas, condensates naturally produced with gas from a gas production well and the like. It is contemplated and within the scope of the present invention that a suitable polymeric latex concentrate or water-in-oil emulsion can be used without dilution, that is, the polymeric latex concentrate or water-in-oil emulsion can be pumped directly into the gas producing formation penetrated by the gas producing well without the addition of any diluent if so desired.

The following examples are provided to illustrate the operability and the application of the process of the present invention.

EXAMPLE I

The following provides a calculated hypothetical example describing the process of the present invention when performed on a watered out gas-producing well. A newly completed gas-producing well yields 2,500,000 standard cubic feet of gas per day and 6 barrels of condensate per day at a flowing wellhead pressure of 250 psi. After 5 years of continuous production, gas production is down to 400,000 standard cubic feet per day and maximum wellhead pressure is reduced to 40 psi. Significant water production is also in evidence as the production tubing is periodically filled with water resulting in complete gas production stoppage. Thus, from time to time it becomes necessary to install a beam pumping unit, controlled by an automatic timer, to periodically pump water out of the production tubing so that the well can continue to flow gas.

At this point it becomes advantageous to apply the process of the present invention. Initially the water in the production tubing is pumped off with a beam pumping unit, the lead line valve is closed, and the production tubing is pressured to 200 psi surface pressure. A nitrogen flush is then used to dry the annulus between the production tubing and the cased well bore followed by the injection of 500 gallons of methanol to remove the remaining water before finally drying the annulus again with nitrogen. After injecting 100 gallons of diesel oil into the well, a drum of polymeric latex concentrate diluted with 400 gallons of diesel oil is injected into the well and overflushed with an additional 100 gallons of diesel oil. The previously mentioned annulus is then flushed dry with nitrogen with sufficient pressure to force the previously injected liquids into the gas-producing formation to a distance of approximately 10 feet outside the well bore area. The gas production well is then returned to production immediately. Hydration of the injected viscosifying polymer by the connate water in the formation penetrated by the well bore decreases the formation permeability to water whereas formation permeability to gas remains essentially unchanged. As a result, the hydrocarbon liquid injected along with the viscosifying polymer is produced along with gas through the production tubing with only relatively small amounts of water to thereby achieve and increase gas-to-water ratio in the well effluent.

Retreatment of the producing gas well in accordance with the process of the present invention can be carried out repeatedly as desired to maintain a favorable gas-to-water ratio in the producing well effluent. The process of the present invention can be readily performed through the existing production tubing and associated equipment in the producing well bore without requiring removal and resetting of production tubing, packers and the like.

EXAMPLE II

Two identical tubes of 1-inch (2.54 cm.) diameter and 12-inch (30.48 cm.) length were used to contain sand packs of Mill Creek sand to demonstrate the effectiveness of the process of the present invention in decreasing water permeability to a much greater degree than any decrease in gas permeability in a gas formation. Each of the tubes was packed with Mill Creek sand and equipped with fittings such that each of the vertically positioned tubes was connected at its upper end into a common effluent line. A common regulated pressurized gas source was attached to the lower end of one tube which was designated as the gas system sand pack via a rotometer. This same regulated pressurized gas source was also connected to the top of a water reservoir vessel which vessel was connected at the bottom thereof to the lower end of the second tube, which second tube was designated as the water system sand pack, in order to inject water under pressure through the designated water system sand pack. Initially, the gas and water were flowed freely through the respective sand pack tubes exiting from the upper ends thereof through the common effluent line. The initial permeabilities of the two sand packs, respectively, to gas and water were determined to be 6.76 and 6.92 darcies. A small slug of methanol was then pumped through the effluent line and downwardly through the sand packs followed by a hydrocarbon-diluted polymeric latex concentrate in the form of a solution mixture consisting of 90 grams of No. 2 diesel oil, 8.5 grams of ALCOFLOOD 1100L (50 weight percent polyacrylamide suspended in oil and available from Allied Colloid Limited), and 1.5 grams of Activator 478 (a detergent emulsion breaker available from American Cyanimid Co.). The injection of the last-mentioned solution mixture into the upper end of each tube and through each sand pack resulted in the permeability changes recorded in Table I.

TABLE I

Relative Permeabilities to Water And Gas in Sand Packs

| Time Elapsed After Injecting Hydrocarbon-Diluted Polymeric Latex Concentrate | Water System Sand Pack Permeability, in darcies | Gas System Sand Pack Permeability, in darcies | % of Initial Gas Permeability |
|---|---|---|---|
| Initial | 6.92 | 6.76 | — |
| 10 Minutes | Plugged | 0.81 | 12 |
| 1 Hour | Plugged | 1.142 | 17 |
| 2 Hours | Plugged | 3.08 | 46 |
| 3 Hours | Plugged | 3.99 | 59 |
| 4 Hours | Plugged | 4.36 | 65 |

As can be seen from the data in Table I, the water system sand pack became completely plugged within 10 minutes after injection of the hydrocarbon-diluted polymeric latex concentrate and subsequent opening of the common effluent line to simulate the return of a gas-bearing formation, represented by the sand packs, to production. The permeability of the gas system sand pack to gas decreased initially, but after 4 hours the gas permeability had increased to about 4.36 darcies, about 65 percent of the initial gas permeability, and the water system sand pack remained plugged. These results provide the surprising indication that injection of a hydrocarbon-diluted polymeric latex concentrate into a gas-bearing formation penetrated by a gas-producing well improves the gas-to-water ratio of the produced effluent by greatly diminishing the permeability of the formation to water while producing a relatively insignificant reduction in gas permeability.

EXAMPLE III

Two identical tubes of 1-inch (2.54 cm.) diameter and 12-inch (30.48 cm.) length were used to contain sand packs of Mill Creek sand to further demonstrate the effectiveness of the process of the present invention in decreasing water permeability to a much greater degree than any decrease in gas permeability in a gas producing formation. This run was carried out in essentially the same manner as described for Example II with the exception that the gas system sand pack was conditioned to produce residual hydrocarbon saturation therein prior to carrying out the run. The designated gas system sand pack was preliminarily conditioned by contacting the gas system sand pack with Soltrol 170 (a light liquid oil available from Phillips Petroleum Company) and subsequently blowing the gas system sand pack dry with nitrogen. The two sand pack tubes were then connected to the test system as described in Example II, and the procedure described in Example II was repeated. The initial permeabilities of the two sand packs, respectively, to gas and water were determined to be 4.89 and 7.86 darcies. The injection of the hydrocarbon-diluted polymeric latex concentrate following a small slug of methanol into the upper end of each tube and through each sand pack resulted in the permeability changes recorded in Table II.

TABLE II

Relative Permeabilities to Water And Gas In Sand Packs

| Minutes Elapsed After Injecting Hydrocarbon-Diluted Polymeric Latex Concentrate | Water System Sand Pack Permeability (Darcies) | Residual Oil-Saturated Gas System Sand Pack Permeability (Darcies) | % of Initial Gas Permeability |
|---|---|---|---|
| Initial | 7.86 | 4.89 | — |
| 5 | Plugged | 1.59 | 33 |
| 20 | Plugged | 2.08 | 43 |
| 60 | Plugged | 2.57 | 53 |
| 120 | Plugged | 3.05 | 62 |
| 180 | Plugged | 4.03 | 82 |
| 240 | Plugged | 4.03 | 82 |

As can be seen from the data in Table II, the water system sand pack became completely plugged within 5 minutes after injection of the hydrocarbon-diluted polymeric latex concentrate and subsequent opening of the common effluent line to simulate the return of a gas-bearing formation, represented by the sand packs, to production. The permeability of the residual oil-saturated gas system sand pack to gas decreased initially, but after 4 hours the gas permeability had increased to about 4.03 darcies, or about 82 percent of the initial gas permeability, and the water system sand pack remained plugged. These results again indicate the unexpected feasibility of injecting a hydrocarbon-diluted polymeric latex concentrate into gas-bearing formations penetrated by gas producing wells to increase the gas-to-water ratio of the fluids therefrom. As can further be seen from the results shown in Table II, the permeability to gas actually returned to about 82 percent of the original gas permeability after 3 hours whereas the permeability to water was reduced to essentially zero 5 minutes after the injection of the hydrocarbon-diluted polymeric latex concentrate of the present invention.

EXAMPLE IV

This example illustrates the actual successful application of the process of the present invention to a gas-producing well in the Garden City, Kansas area. This particular gas well had been shut down after being tested at about 70 barrels of water per day with relatively little gas flow. The original gas potential of this well was 100,000 standard cubic feet of gas per day. After treating the well in accordance with the process of the present invention, the well was flowing water-free gas.

From the foregoing detailed description and examples, it will be readily apparent that the process of the present invention achieves the previously stated objects and overcomes the problems described above with regard to excessive water flow from a gas-producing formation into the well bore of a producing gas well.

It will be understood that the specification and examples are provided for the purposes of illustrating and explaining the invention and that suitable variations may be made within the scope of the appended claims without departing from the invention.

That which is claimed is:

1. A process for reducing the flow of water from a gas producing subsurface formation into the well bore of a gas producing well penetrating said formation, comprising:
   injecting a hydrocarbon-diluted polymeric latex concentrate into said formation via said well bore, said hydrocarbon-diluted polymeric latex concentrate comprising a quantity of viscosifying polymer, a quantity of hydrocarbon diluent and a quantity of water, said quantity of water being present in an amount in the range from about 0.01 to about 5.0 percent by weight based on the weight of said hydrocarbon-diluted polymeric latex concentrate; and
   allowing said polymeric latex concentrate to be contacted with connate water in said subsurface formation so as to substantially reduce the water permeability of said subsurface formation proximate said well bore while maintaining the gas permeability of said subsurface formation substantially unrestricted.

2. A process in accordance with claim 1 wherein said hydrocarbon diluent is present in an amount in the range from about 75 to about 99 percent by weight based on the weight of said hydrocarbon-diluted polymeric latex concentrate.

3. A process in accordance with claim 2 wherein said viscosifying polymer is present in an amount in the range from about 1.0 to about 20 percent by weight based on the weight of said hydrocarbon-diluted polymeric latex concentrate.

4. A process in accordance with claim 3 wherein said hydrocarbon-diluted polymeric latex concentrate further comprises a water-in-oil emulsifying agent in an amount in the range from about 0.001 to about 30 percent by weight based on the weight of said hydrocarbon-diluted polymeric latex concentrate.

5. A process in accordance with claim 1 wherein the step of injecting a hydrocarbon-diluted polymeric latex concentrate into said subsurface formation via said well bore is preceded by the step of:
   injecting a quantity of alcohol into said gas producing well so as to substantially remove water from the well bore.

6. A process in accordance with claim 1 wherein said polymeric latex concentrate is a water-in-oil emulsion comprising a viscosifying polymer diluted with a hydrocarbon.

7. A process in accordance with claim 6 wherein said viscosifying polymer is polyacrylamide.

8. A process in accordance with claim 6 wherein said viscosifying polymer is polyacrylamide and said hydrocarbon is diesel oil.

9. A process in accordance with claim 6 wherein said viscosifying polymer hydrates upon contact with connate water in said subsurface formation so as to swell in said formation to selectively substantially reduce the water permeability of said subsurface formation where contacted by said connate water.

10. A process in accordance with claim 1 characterized further to include:
    allowing said gas producing subsurface formation to produce gas and portions of said previously injected hydrocarbon-diluted polymeric latex concentrate back into the well bore of said gas producing well.

11. A process for reducing the flow of water from a gas producing subsurface formation into the well bore of a gas producing well penetrating said formation, comprising:
    injecting a quantity of alcohol into said gas producing well so as to substantially remove water from the well bore;
    thereafter injecting a hydrocarbon-diluted polymeric latex concentrate into said formation via said well bore, said hydrocarbon-diluted polymeric latex concentrate comprising:
       water in an amount in the range from about 0.01 to about 5.0 percent by weight based on the weight of said hydrocarbon-diluted polymeric latex concentrate;
       a hydrocarbon diluent in an amount in the range from about 75 to about 99 percent by weight based on the weight of said hydrocarbon-diluted polymeric latex concentrate; and
       a viscosifying polymer in an amount in the range from about 1.0 to about 20 percent by weight based on the weight of said hydrocarbon-diluted polymeric latex concentrate; and
    subsequently allowing said gas producing subsurface formation to produce gas and portions of said previously injected hydrocarbon-diluted polymeric latex concentrate back into the well bore of said gas producing well.

12. A process in accordance with claim 11 wherein said water in said hydrocarbon-diluted polymeric latex concentrate is present in an amount in the range from about 0.01 to about 3.0 percent by weight based on the weight of said hydrocarbon-diluted polymeric latex concentrate.

13. A process in accordance with claim 12 wherein said hydrocarbon diluent is present in an amount in the range from about 85 to about 95 percent by weight based on the weight of said hydrocarbon-diluted polymeric latex concentrate.

14. A process in accordance with claim 13 wherein said viscosifying polymer is present in an amount in the range from about 5 to about 15 percent by weight based on the weight of said hydrocarbon-diluted polymeric latex concentrate.

15. A process in accordance with claim 14 wherein said hydrocarbon-diluted polymeric latex concentrate further comprises a water-in-oil emulsifying agent in an amount in the range from about 0.1 to about 10 percent by weight based on the weight of said hydrocarbon-diluted polymeric latex concentrate.

16. A process in accordance with claim 11 wherein said hydrocarbon-diluted polymeric latex concentrate further comprises a water-in-oil emulsifying agent in an amount in the range from about 0.001 to about 30 percent by weight based on the weight of said hydrocarbon-diluted polymeric latex concentrate.

* * * * *